United States Patent [19]

Neeb et al.

[11] Patent Number: 4,638,053

[45] Date of Patent: Jan. 20, 1987

[54] PROCESS FOR THE PREPARATION OF CHLOROZINCATE SALTS OF BENZO THIAZOLIUM AZO DYESTUFFS BY ALKYLATING WITH DIALKYLSULFATE IN AQUEOUS MEDIUM IN THE PRESENCE OF ZN-CONTAINING ACID ACCEPTOR AT PH≦7

[75] Inventors: Rudolf Neeb, Obertshausen; Reinhard Mohr, Offenbach am Main, both of Fed. Rep. of Germany

[73] Assignee: Hoechstaktiengesellschaft, Fed. Rep. of Germany

[21] Appl. No.: 775,111

[22] Filed: Sep. 11, 1985

Related U.S. Application Data

[63] Continuation of Ser. No. 218,449, Dec. 19, 1980, abandoned, which is a continuation of Ser. No. 143,716, Mar. 29, 1978, abandoned, which is a continuation of Ser. No. 925,871, Jul. 18, 1978, abandoned.

[30] Foreign Application Priority Data

Jul. 22, 1977 [DE] Fed. Rep. of Germany ....... 2733178

[51] Int. Cl.$^4$ .................. C09B 29/045; C09B 43/11; C09B 44/20
[52] U.S. Cl. .................... 534/589; 534/607; 534/611; 534/640; 534/788
[58] Field of Search ............... 534/589, 788, 611, 607, 534/640

[56] References Cited

U.S. PATENT DOCUMENTS 3,991,043 11/1976 Illy .................... 534/589 X
4,002,604 1/1977 Fawkes et al. .................. 534/589 X

FOREIGN PATENT DOCUMENTS

| 48-28529 | 4/1973 | Japan | 534/589 |
| 7624529 | 7/1976 | Japan | 534/589 |
| 787369 | 12/1957 | United Kingdom | 534/589 |
| 1276686 | 6/1972 | United Kingdom | 534/589 |
| 1411243 | 10/1975 | United Kingdom | 534/589 |
| 1533260 | 11/1978 | United Kingdom | 534/589 |

*Primary Examiner*—Floyd D. Higel
*Attorney, Agent, or Firm*—Connolly and Hutz

[57] ABSTRACT

Chlorozincate salts of benzothiazonium azo compounds are prepared by reacting benzothiazolium azo compounds with an dialkylsulfate having from 1 to 4 carbon atoms in the alkyl radicals, which process comprises carrying out the reaction in an aqueous medium at a temperature of from 10° to 80° C. in the presence of an acid acceptor and the alkylation with the use of from 1.8 to 2.5 mols of the dialkylsulfate, calculated on the starting azo dyestuff, at a pH not exceeding 7. The prepared benzothiazolium azo compound is precipitated as chlorozincate salt, especially with the use of an alkali metal chloride. According to this process, the chlorozincate salts are obtained in higher purity. A perceptible decomposition of the benzothiazolium azo compound does not occur. Chemicals, for example the alkylation agent and acid-binding agents need be used in a small quantity. In addition to this economy and to the less pollution of the waste water, the process has the advantage that it can be carried out with the use of a small reaction volume.

8 Claims, No Drawings

PROCESS FOR THE PREPARATION OF CHLOROZINCATE SALTS OF BENZO THIAZOLIUM AZO DYESTUFFS BY ALKYLATING WITH DIALKYLSULFATE IN AQUEOUS MEDIUM IN THE PRESENCE OF ZN-CONTAINING ACID ACCEPTOR AT PH≦7

This application is a continuation of application Ser. No. 218,449, filed Dec. 19, 1980, now abandoned, which is is a continuation of application Ser. No. 143,716 filed Mar. 29, 1978, now abandoned which is a continuation of application Ser. No. 925,871 filed July 18, 1978 now abandoned.

The present invention relates to a simple and improved process for the preparation of chlorozincate salts of benzothiazolium azo dyestuffs in order to obtain them in a pure form.

German Offenlegungsschrift No. 1,943,799 (said to be based upon U.S. Ser. No. 760,681, filed Sept. 18, 1968; see also U.S. Pat. No. 3,991,043 and British Pat. No. 1,276,686, also said to be based upon this application) discloses a process for the preparation of benzothiazolium azo compounds by alkylation of benzothiazole-azo-p-aniline compounds by means of a dialkylsulfo ester in an aqueous medium and in the presence of a basic substance, which comprises adding the dialkylsulfo ester continuously to an aqueous alkaline dispersion of the azo dye in a total quantity of from 1 to 5 mols, preferably of from 3 to 5 mols, per mole of the feed azo dye. Owing to the fact that a considerable portion of the dialkylsulfate employed is hydrolyzed by the water serving as the reaction medium, there are alternatively used in the examples of said reference of from 4.3 to 5.1 mols of dialkylsulfate per mol of benzothiazole azo dye; consequently, a great excess of dialkylsulfate is required in any case in order to achieve a complete alkylation.

When performing the known process by using less than three mols of dialkylsulfate per mol of benzothiazole azo dye, the thin layer chromatography of the isolated quaternated benzothiazolium azo dye reveals a considerable content of unquaternated starting compound. When dyeing polyacrylonitrile fibers together with polyamide fibers as accompanying fibers with thus obtained dyes, the polyamide fibers are strongly dyed red shades.

These disadvantages are avoided by the novel process according to the invention for the preparation of chlorozincate salts of benzothiazolium azo dyes, in which the chlorozincate salt is obtained directly in pure form.

This process according to the invention relates to the preparation of chlorozincate salts of benzothiazolium azo dyes in pure form by treating a benzothiazole azo compound with an dialkylsulfate having of from 1 to 4 carbon atoms in the alkyl radicals, preferably dimethylsulfate, in an aqueous medium at a temperature of from about 10° to 80° C., especially of from 10° to 50° C. and preferably of from 20° to 40° C., in the presence of an acid acceptor and by subsequently separating the chlorozincate salt, wherein the improvement consists in carrying out the alkylation with the use of 1.8 to 2.5 mols of the dialkylsulfate, calculated on the benzothiazole azo compound, in the presence of a zinc compound capable of binding an acid, at a pH not exceeding 7, and, if desired, subsequently separating the chlorozincate salt by adding an alkali metal chloride.

The quaternation reaction may be carried out with cooling to maintain a definite reaction temperature,—or without cooling with the same good result under adiabatic conditions by adding the dialkylsulfate to the reaction batch which has a temperature of from about 20° to 35° C., all at once or batchwise in rapid sequences. Generally the temperature in the reaction batch thus rises by about 40° C., however, a temperature increase of the reaction mixture above 80° C. should be avoided by cooling. Working under adiabatic conditions has the advantage that in the case of a reaction batch which seems to be suitable for this method of operating, the temperature need not be controlled during the reaction and the quaternation reaction can be performed in a relatively short period owing to the relatively high reaction temperature.

However, in general, the dialkylsulfate will be added slowly with controlling the temperature of the reaction mixture.

Suitable acid-binding zinc compounds are especially zinc oxide, zinc carbonate, zinc hydroxide and zinc acetate or mixtures thereof, zinc oxide being used preferably. As alkali metal chloride, sodium chloride is used especially, besides potassium chloride.

The process according to the invention preferably relates to the preparation of benzothiazolium azo compounds of the formula I

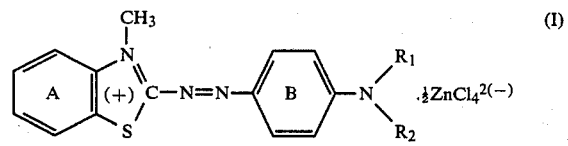

from benzothiazole azo compounds of the formula II

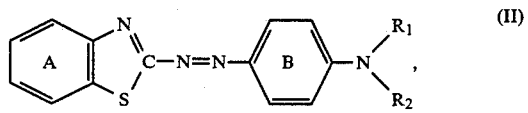

in which the individual radicals have the following meanings:

R₁ and R₂ are identical or different to each other and
  R₁ is a hydrocarbon atom or alkyl having from 1 to 4 carbon atoms, which may be substituted by a cyano group, a hydroxy group, a phthalimide radical or a chlorine atom, or is benzyl, phenyl or naphthyl or alkylene having of from 1 to 4 carbon atoms, the latter may be substituted by a halogen atom, for example chlorine or bromine;
R₂ is a hydrogen atom or alkyl having of from 1 to 4 carbon atoms, which may be substituted by a chlorine atom or a cyano or hydroxy group, or is alkylene having of from 1 to 4 carbon atoms, which may be substituted by halogen, for example chlorine or bromine, or
R₁ and R₂ form together with the nitrogen atom a piperidine or morpholine ring,
the benzene nucleus A may be substituted by 1 or 2 substituents selected from the group consisting of halogen, preferably chlorine, alkyl having of from 1 to 4 carbon atoms, preferably methyl, and alkoxy having of from 1 to 4 carbon atoms, preferably methoxy and ethoxy, the benzene nucleus B may be substituted by 1 or 2 substitutents selected from the group consisting of halogen, preferably chlorine, alkyl having of from 1 to 4 carbon atoms, preferably methyl, and alkoxy having of from 1 to 4 carbon atoms, preferably methoxy and ethoxy.

The process according to the invention moreover preferably relates to the preparation of benzothiazolium azo compounds of the formula I in which $R_1$ is alkyl having of from 1 to 4 carbon atoms, preferably methyl and ethyl, β-hydroxyethyl or β-chloroethyl, $R_2$ is methyl, ethyl, βhydroxyethyl, β-cyanoethyl, allyl, β-bromoallyl or β-methylallyl, $R_1$ and $R_2$ being identical or different, and the benzene nucleus A being optionally substituted by methyl, methoxy and/or ethoxy and the benzene nucleus B being optionally substituted by methyl and/or chlorine.

The zinc compounds used in the process according to the invention, permit to adjust the reaction medium at a slightly acidic pH of from 3 to 7, preferably 4 to 7, which is advantageous for the quaternation of benzothiazole azo compounds. Benzothiazole azo compounds are very weak bases, and their salts are hydrolyzed practically completely at pH 2; the free electron pair of the nitrogen atom in the thiazole ring is thus available for the alkylation at this pH so that the reaction with dialkylsulfates can already be carried out in the acid range, contrary to common quaternations of other azo dyes. Furthermore the quaternated benzothiazolium azo dyes formed are very sensitive to higher pH values in aqueous solution; at pH of from 9 to 10, for example, which is found in the case of an aqueous suspension of magnesium oxide, the benzothiazolium azo compound is gradually decomposed to form a nonsoluble residue. Therefore the quaternation in an acid range generally yields products of better quality and a smaller quantity of residues.

On the other hand, the hydrolysis of the dialkylsulfate yielding alkylsulfuric acid and sulfuric acid, is by far more pronounced in the acid range than when operating in a slightly acid range so that when working in this pH range, a great excess of alkylation agent is required in order to compensate for the loss of alkylation agent. This is avoided by the process of the invention, in which the use of an acid-binding zinc compound makes it possible to maintain a slightly acid pH-range. Thus when using for example zinc oxide as the acid acceptor according to the present invention, about 2.3 mols of dialkylsulfate per mol of benzothiazole azo compound suffice.

The process of the present invention is suitably started at pH of the reaction mixture of about 5 to 7, preferably 6 to 7, and near the end of the reaction a pH of from about 0.5 to 1 may be reached.

Advantageously the pH should not drop below 2 during the quaternation reaction.

A further advantage of the process of the invention resides in the fact that per mol of starting compound only about 0.1 to 1 mol of zinc oxide or of another acid-binding zinc compound suitable for the intended purpose need be used for the alkylation reaction, this quantity of zinc compound being a small excess only with regard to the quantity required for separating the quaternary dye as chlorozincate salt.

It is essential for the industrial preparation of benzothiazolium azo dyes that, upon completion of the alkylation, even tiny residues of the highly toxic dialkylsulfate (dimethylsulfate, for example, has a MAK-value of 0.01 ppm; MAK means the maximal concentration of a substance at the place of work) be destroyed in the reaction medium. This may be reached by heating the acid reaction mixture, while stirring, at a temperature of from about 60° to 80° C., until residues of unreacted dialkyl sulfate have been completely hydrolyzed. The desired benzothiazolium azo dye which has been synthesized, is not adversely affected by this process, since it is completely stable in the strongly acid medium, even near its boiling temperature. Consequently, the dialkylsulfate is advantageously destroyed at pH below 2.

For obtaining the pure benzothiazolium azo dye, a filtration is recommended which may be readily carried out upon destruction of the excess dialkylsulfate at elevated temperature. Upon clarification, the dyestuff is precipitated in the form of easily crystallizing tetrachlorozincate by the addition of solid alkali metal chloride, thereafter filtered off and dried at a temperature of about 60° C. Since the precipitation agent, namely zinc chloride, is formed from the acid acceptor, for example zinc oxide, it need not be added additionally. Thus, the process of the invention has the further advantage that it has a relatively low consumption of chemicals and, consequently, the waste water is less polluted.

The process according to the invention moreover requires only a small reaction volume, owing to the low salt content of the dyestuff solution because of the small quantity of acid-binding zinc compound used.

The invention will be illustrated in the following Examples, in which parts and percentages are by weight.

EXAMPLE 1

64 Parts of a moist filter cake of a dyestuff (dyestuff content of 35.6 parts) which had been obtained by coupling diazotized 2-amino-6-methoxy-benzothiazole with N-ethyl-N-phenylaminoethanol in water as reaction medium, were stirred with 70 parts of water and 4.9 parts of zinc oxide. While intensely stirring, 28.2 parts of dimethyl sulfate were added within 2 hours at a temperature of from 35° to 40° C. Thereafter stirring was continued for 3 hours at the above temperature. Subsequently, the mixture was diluted with 400 parts of water, 2 parts of kieselguhr and 0.6 part of activated carbon were added, the resulting mixture was heated to 60° C. and kept at this temperature while stirring for 2 hours. Thereafter the dyestuff solution was filtered, the dyestuff was precipitated as tetrachlorozincate by adding 64 parts of sodium chloride, filtered off and dried at 60° C.

45 Parts of a pure dyestuff of the formula

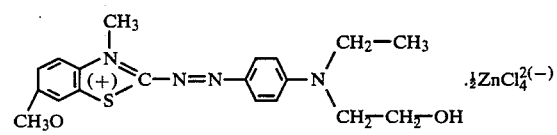

were obtained, which corresponds to 94.7% of the theory.

EXAMPLE 2

The dyestuff synthesis was carried out analogously to Example 1, except that instead of zinc oxide 7.5 parts of zinc carbonate were used as acid-binding agent. The dyestuff was obtained in a yield of 92.6% of the theory in the same high purity as in Example 1.

EXAMPLE 3

The dyestuff was obtained analogously to Example 1, except that instead of zinc oxide there were used 6.0 parts of zinc hydroxide as acid-binding agent. The dyestuff was obtained in a yield of 92.5% of the theory in the same high purity.

EXAMPLE 4

The dyestuff preparation was carried out analogously to Example 1, except that instead of zinc oxide there were used 6.0 parts of zinc hydroxide which had been obtained by reaction of a solution of 18 parts of zinc sulfate heptahydrate with a stoichiometrical quantity of an aqueous sodium hydroxide solution, filtering off and thoroughly washing out the precipitate. The synthesized benzothiazolium azo dyestuff was obtained in a yield of 90.5% of the theory in the same high purity.

EXAMPLES 5 TO 40

Further benzothiazolium azo dyestuffs, which are listed in the following Table, were obtained in high purity and in a good yield according to the process of the invention, for example in conformity with one of the methods described in the above Examples or with a variant thereof within the scope of the present invention.

| Example No. | Dyestuff with $\frac{1}{2}ZnCl_4^{2(-)}$ as anion | Yield in % of the theory |
|---|---|---|
| 5 | 6-methoxy-3-methyl-benzothiazolium-2-azo-4'-(N-methyl-N-2-hydroxyethylamino)benzene | 93.7 |
| 6 | 3-methyl-benzothiazolium-2-azo-4'-(N,N-dimethylamino)benzene | 87.4 |
| 7 | 3-methyl-benzothiazolium-2-azo-4'-(N,N-diethylamino)benzene | 89.2 |
| 8 | 3-methyl-benzothiazolium-2-azo-4'-(N-ethyl-N-2-hydroxyethylamino)benzene | 87.0 |
| 9 | 3-methyl-benzothiazolium-2-azo-4'-(N,N-di-2-hydroxyethylamino)benzene | 90.0 |
| 10 | 6-methyl-3-methyl-benzothiazolium-2-azo-4'-(N,N-dimethylamino)benzene | 85.3 |
| 11 | 6-methyl-3-methyl-benzothiazolium-2-azo-4'-(N,N-diethylamino)benzene | 91.8 |
| 12 | 6-methyl-3-methyl-benzothiazolium-2-azo-4'-(N-ethyl-N-2-hydroxyethylamino)benzene | 88.4 |

| Example No. | Dyestuff with ½ZnCl₄²⁽⁻⁾ as anion | Yield in % of the theory |
|---|---|---|
| 13 | 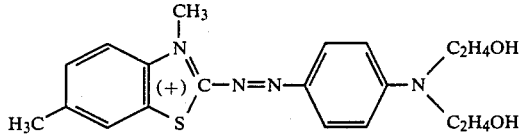 | 89.0 |
| 14 | 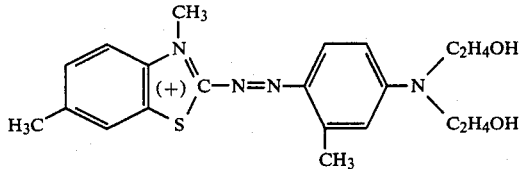 | 84.3 |
| 15 | 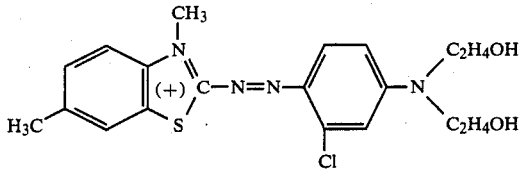 | 80.7 |
| 16 | 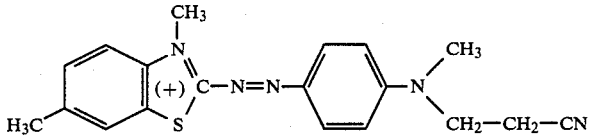 | 82.3 |
| 17 | 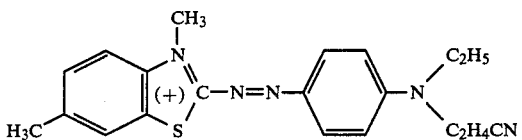 | 87.9 |
| 18 | 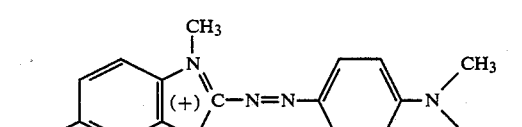 | 93.4 |
| 19 | 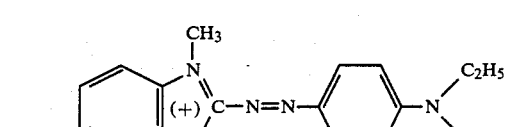 | 92.0 |
| 20 | 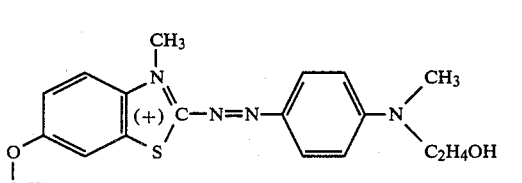 | 89.2 |
| 21 | 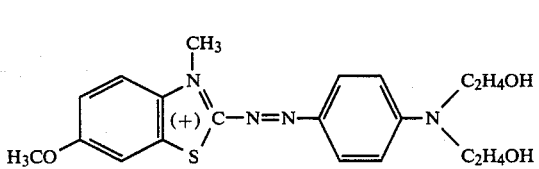 | 91.2 |

-continued

| Example No. | Dyestuff with ½ZnCl₄²⁽⁻⁾ as anion | Yield in % of the theory |
|---|---|---|
| 22 | H₃CO-[benzothiazole, N-CH₃, (+)C]-N=N-[phenyl, 3-CH₃]-N(C₂H₄OH)(C₂H₄OH) | 89.3 |
| 23 | H₃CO-[benzothiazole, N-CH₃, (+)C]-N=N-[phenyl, 3-Cl]-N(C₂H₄OH)(C₂H₄OH) | 86.4 |
| 24 | H₃CO-[benzothiazole, N-CH₃, (+)C]-N=N-[phenyl]-N(CH₃)(C₂H₄CN) | 85.0 |
| 25 | H₃CO-[benzothiazole, N-CH₃, (+)C]-N=N-[phenyl]-N(C₂H₅)(C₂H₄CN) | 87.3 |
| 26 | H₃CO-[benzothiazole, N-CH₃, (+)C]-N=N-[phenyl]-N(C₄H₉)(C₂H₄CN) | 89.3 |
| 27 | H₃CO-[benzothiazole, N-CH₃, (+)C]-N=N-[phenyl]-N(CH₃)(CH₂-CH=CH₂) | 91.2 |
| 28 | H₃CO-[benzothiazole, N-CH₃, (+)C]-N=N-[phenyl]-N(CH₃)(CH₂-C(CH₃)=CH₂) | 88.7 |
| 29 | H₃CO-[benzothiazole, N-CH₃, (+)C]-N=N-[phenyl]-N(CH₃)(CH₂-C(Br)=CH₂) | 88.7 |
| 30 | H₃CO-[benzothiazole, N-CH₃, (+)C]-N=N-[phenyl]-N(C₂H₄OH)(CH₂-CH=CH₂) | 84.5 |

-continued

| Example No. | Dyestuff with ½ZnCl₄²⁻ as anion | Yield in % of the theory |
|---|---|---|
| 31 | benzothiazolium (H₃CO-, N-CH₃) —C(+)—N=N— C₆H₄—N(C₂H₄OH)(CH₂—C(CH₃)=CH₂) | 80.0 |
| 32 | benzothiazolium (H₃CO-, N-CH₃) —C(+)—N=N— C₆H₄—N(CH₂—CH₂—Cl)(CH₂—CH=CH₂) | 83.2 |
| 33 | benzothiazolium (H₃CO-, N-CH₃) —C(+)—N=N— C₆H₄—N(C₂H₄Cl)(CH₂—C(CH₃)=CH₂) | 85.6 |
| 34 | benzothiazolium (N-CH₃) —C(+)—N=N— C₆H₄—N(CH₃)(C₂H₄CN) | 88.3 |
| 35 | benzothiazolium (C₂H₅O-, N-CH₃) —C(+)—N=N— C₆H₄—N(C₂H₅)(C₂H₄—OH) | 90.1 |
| 36 | benzothiazolium (H₃C-, N-CH₃) —C(+)—N=N— C₆H₄—N(CH₃)(CH₂—CH=CH₂) | 85.6 |
| 37 | benzothiazolium (H₃C-, N-CH₃) —C(+)—N=N— C₆H₄—N(CH₃)(CH₂—C(CH₃)=CH₂) | 83.6 |
| 38 | benzothiazolium (H₃C-, N-CH₃) —C(+)—N=N— C₆H₄—N(CH₃)(CH₂—C(Br)=CH₂) | 72.5 |
| 39 | benzothiazolium (H₃C-, N-CH₃) —C(+)—N=N— C₆H₄—N(C₂H₄OH)(CH₂—CH=CH₂) | 81.1 |

| Example No. | Dyestuff with $\frac{1}{2}ZnCl_4^{2(-)}$ as anion | Yield in % of the theory |
|---|---|---|
| 40 | 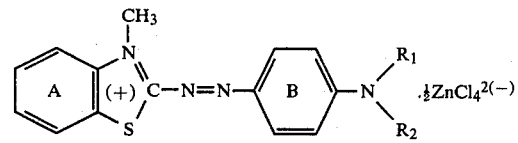 | 83.2 |

EXAMPLE 41

According to Example 1, 64 parts of a moist filter cake of the benzothiazole deystuffs described in Example 1, were stirred with 70 parts of water and 4.9 parts of zinc oxide. While intensely stirring, 28.2 parts of dimethylsulfate were added all at once at 35° C. and the reaction mixture was stirred for 5 hours while cooling at a temperature of from 35° to 40° C. The reaction mixture was diluted with 400 parts of water and then clarified and worked up analogously to Example 1. The benzothiazolium dyestuff was obtained in the same purity and yield as in Example 1.

EXAMPLE 42

The procedure was analogous to that of Example 41, except that it was carried out under adiabatic conditions: 64 parts of the moist filter cake of said benzothiazole dyestuff were stirred with 70 parts of water and 4.9 parts of zinc oxide. While intensely stirring, 28.2 parts of dimethylsulfate were added all at once at 35° C., and stirring was continued for 3 hours without cooling, whereby the temperature rose from 35° to about 75° C. Upon addition of water, the reaction mixture was worked up in conformity with the method described in Example 1. The benzothiazolium dyestuff described in Example 1 was obtained in the same purity and yield.

Operating under adiabatic conditions has the advantage that the temperature of the reaction mixture need not be controlled throughout the reaction and that a shorter reaction time is sufficient owing to the higher reaction temperature.

We claim:

1. In a process for the preparation of a chlorozincate salt of a benzothiazolium azo compound by treating a benzothiazole azo compound with a dialkylsulfate having of from 1 to 4 carbon atoms, in an aqueous medium at a temperature of from about 10° to 80° C., the improvement which comprises carrying out the alkylation with the use of 1.8 to 2.5 mols of the dialkylsulfate calculated on the starting azo compound, and in the presence of an acid acceptor consisting essentially of a zinc compound capable of binding an acid, at a pH not exceeding 7, and separating the tetrachlorozincate salt of the benzothiazolium azo compound formed by adding an alkali metal chloride.

2. The process according to claim 1, wherein the zinc compound used as acid-binding agent, is zinc oxide, zinc carbonate, zinc hydroxide or zinc acetate.

3. The process according to claim 2, which comprises carrying out the alkylation at a pH of from 3 to 7.

4. The process according to claim 3, wherein the zinc compound capable of binding acid is used in an amount of from 0.6 to 1.0 mol per mol of the starting benzothiazole azo compound.

5. The process according to claim 1, which comprises preparing as benzothiazolium azo compound a compound of the formula

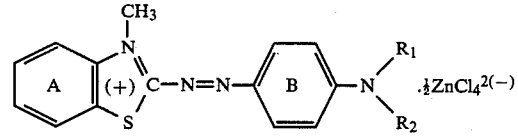

in which $R_1$ and $R_2$ are identical or different from each other and $R_1$ is hydrogen or alkyl of from 1 to 4 carbon atoms unsubstituted or substituted by cyano, hydroxy, phthalimide or chlorine, or is benzyl, phenyl, naphthyl or alkenyl of from 1 to 4 carbon atoms or is alkenyl of from 1 to 4 carbon atoms substituted by halogen, $R_2$ is hydrogen or alkyl of from 1 to 4 carbon atoms unsubstituted or substituted by chlorine, cyano or hydroxy, or is alkenyl of from 1 to 4 carbon atoms, unsubstituted or substituted by halogen, or $R_1$ and $R_2$ together with the nitrogen atom are piperidino or morpholino, the benzene nucleus A is unsubstituted or substituted by 1 or 2 substituents selected from the group consisting of halogen, alkyl of from 1 to 4 carbon atoms and alkoxy of from 1 to 4 carbon atoms, and the benzene nucleus B is unsubstituted or substituted by 1 or 2 substituents selected from the group consisting of halogen, alkyl of from 1 to 4 carbon atoms and alkoxy of from 1 to 4 carbon atoms.

6. The process according to claim 1, which comprises preparing as the benzothiazolium azo compound a compound of the formula:

in which $R_1$ and $R_2$ are identical or different from each other and $R_1$ is alkyl of from 1 to 4 carbon atoms, β-hydroxyethyl or β-chloroethyl, $R_2$ is methyl, ethyl, β-hydroxyethyl, β-cyanoethyl, allyl, β-bromoallyl or β-methylallyl, and the benzene nucleus A is unsubstituted or substituted by substituents selected from methyl, methoxy and ethoxy, and the benzene nucleus B is unsubstituted or substituted by methyl or chlorine or methyl and chlorine.

7. The process according to claim 1, which comprises preparing as benzothiazolium azo compound the compound of the formula

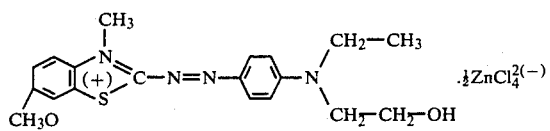

8. A process for the preparation of a benzothiazolium azo compound and its separation as tetrachlorozincate salt comprising the steps of: alkylating the starting benzothiazole azo compound which is the precursor of the benzothiazolium azo compound with 1.8 to 2.5 moles, calculated with respect to said starting benzothiazole azo compound, of a dialkulsulfate, said dialkylsulfate having 1 to 4 carbon atoms in the alkyl radicals, in an aqueous medium at a pH not exceeding 7 in the presence of a zinc-containing acid acceptor at a temperature of from about 10° to 80° C., said zinc-containing acid acceptor consisting essentially of a zinc compound capable of binding an acid and subsequently forming and separating the tetrachlorozincate salt from the aqueous medium by the addition of an alkali metal chloride.

* * * * *